54-44.3 EX
H8682 OR AI 121
W. E. JONES.
Riding-Saddle.
No 121. A. I. Patented Apr. 17. 1855.
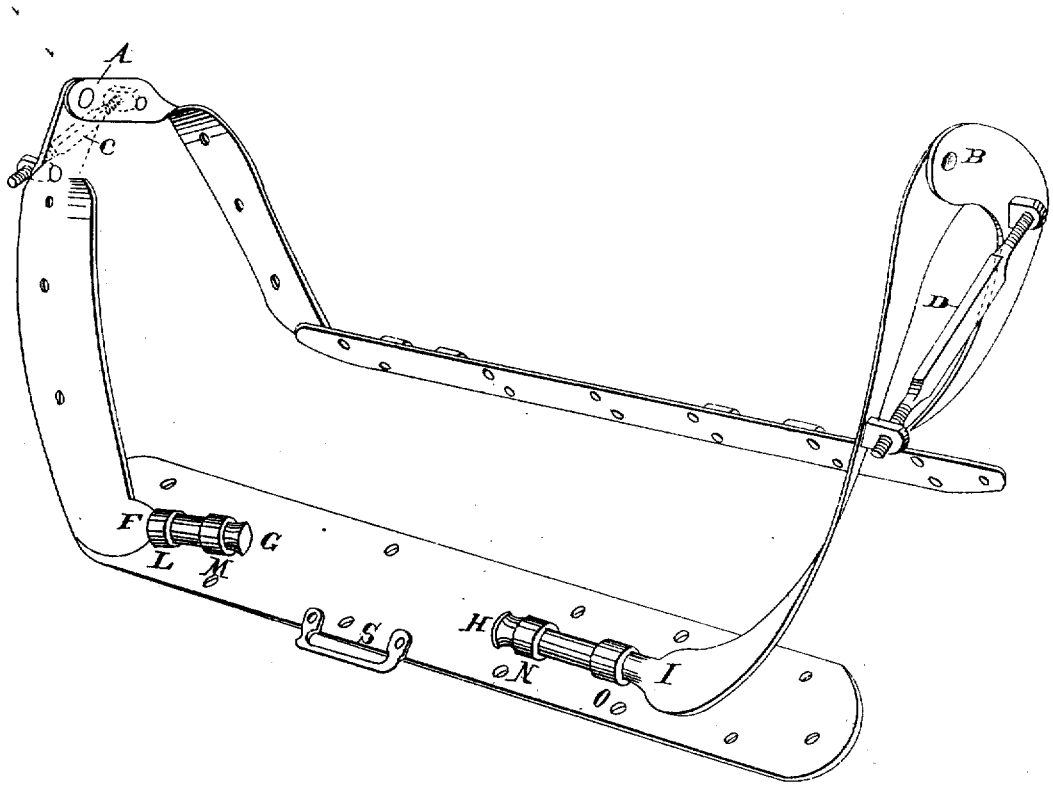
N. PETERS, PHOTO-LITHOGRAPHER, WASHINGTON, D. C.

W. E. Jones,

Additional Improvement No. 121.

BEST AVAILABLE COPY

Additional to Letters Patent No. 11,068 June 13, 1854.

To whom it may concern: Be it known that I Wm. E. Jones of the United States Regiment of Mounted Riflemen have made certain improvements on the new and improved saddle tree patented by me on the thirteenth day of June 1854: and I do hereby declare that the following is a full and exact account and description thereof reference being had to the accompaning drawings and to the letters of reference marked thereon.

The advantages of this tree over the one already patented consists in attaching the side pieces to the forks in such a way that pressure on the saddle to whatever degree (contracted or expanded) will cause the side pieces to lay flat on the horse.

To enable others skilled in the art to make and use my improvement in my invention I will proceed to describe its construction and operation.

The lower extremities of the forks terminate in the round bolts F G and H I and those corresponding on the other side. Each of these are fastened to the side pieces by two flat iron staples L and M and N and O. These pass over the bolts and through the side pieces and are riveted on the under side. The bolts are driven down next the side pieces to facilitate the rotary motion of the side pieces and they are enlarged at the extremities to prevent them from slipping, out of the staples. The loop S riveted to the side pieces is for the stirrup leather. I am aware

BEST AVAILABLE COPY that side pieces or adjustable pads have been attached to the saddle tree as in those of J. C. F. Salomon patented in 1851 for instance. But in these and similar cases it is for the purpose of adjusting a rigid saddle tree to horses of different shaped backs. While this adjustment in my saddle tree is for the purpose of enabling me to derive the full benefit from the adjustability obtained by the hinges and screws at the cantle and pommel fitting different sized as well as shaped backs.

What therefore I claim as my invention and desire to have attached to my aforesaid patent as an additional improvement is; The combination, with the hinged pommel and cantle of the self adjusting side pieces for the purpose of preventing an unequal pressure upon the edges of the side pieces however much the saddle tree be expanded or contracted.

Witnesses

J. D. Clark,
Geo, Patten

Inventor
Wm. E. Jones.